(12) United States Patent
Olson et al.

(10) Patent No.: US 8,471,723 B2
(45) Date of Patent: Jun. 25, 2013

(54) APPARATUS AND METHOD FOR ESTABLISHING COMMUNICATION FROM REMOTE SITES IN A FIXED METER READING NETWORK

(75) Inventors: John A. Olson, Brookfield, WI (US); Mark Lazar, New Berlin, WI (US); Kelly Laughlin-Parker, Waukesha, WI (US); Michele R. B. Malinowski, Hartford, WI (US); Randy Schultz, Fredonia, WI (US); Ryan M. Beverung, Austin, TX (US); Theresa Saadeh, Milwaukee, WI (US)

(73) Assignee: Badger Meter, Inc., Milwaukee, WI (US)

( * ) Notice: Subject to any disclaimer, the term of this patent is extended or adjusted under 35 U.S.C. 154(b) by 265 days.

(21) Appl. No.: 12/792,128

(22) Filed: Jun. 2, 2010

(65) Prior Publication Data
US 2011/0140909 A1    Jun. 16, 2011

Related U.S. Application Data

(63) Continuation-in-part of application No. 12/635,079, filed on Dec. 10, 2009, now abandoned.

(51) Int. Cl.
G08C 19/16    (2006.01)
(52) U.S. Cl.
USPC ............ 340/870.01; 340/870.02; 340/870.03; 340/870.06; 340/870.11; 340/870.15; 340/870.28; 340/870.43
(58) Field of Classification Search
USPC ............ 340/870.01, 870.02, 870.03, 870.06, 340/870.11, 870.15, 870.28, 870.43
See application file for complete search history.

(56) References Cited

U.S. PATENT DOCUMENTS

| | | | |
|---|---|---|---|
| 4,642,634 A * | 2/1987 | Gerri et al. ............... | 340/870.02 |
| 4,940,976 A | 7/1990 | Gastouniotis et al. | |
| 5,298,894 A | 3/1994 | Cerny et al. | |
| 7,061,398 B2 | 6/2006 | Holmes et al. | |
| 7,304,587 B2 * | 12/2007 | Boaz ........................ | 340/870.02 |
| 7,400,264 B2 | 7/2008 | Boaz | |
| 2005/0195775 A1 * | 9/2005 | Petite et al. ................... | 370/338 |
| 2007/0013547 A1 | 1/2007 | Boaz | |
| 2008/0144548 A1 | 6/2008 | Shuey et al. | |
| 2010/0073193 A1 * | 3/2010 | Flammer, III ............ | 340/870.11 |
| 2010/0188255 A1 * | 7/2010 | Cornwall ................. | 340/870.02 |
| 2010/0265096 A1 * | 10/2010 | Cornwall et al. ........ | 340/870.02 |
| 2011/0077037 A1 | 3/2011 | Osterloh et al. | |

* cited by examiner

*Primary Examiner* — Arnold Kinkead
*Assistant Examiner* — Richard Tan
(74) *Attorney, Agent, or Firm* — Boyle Fredrickson, S.C.

(57) ABSTRACT

A method and apparatus is disclosed for adjusting a transmission power level of a transceiver (12, 15) at a utility meter data origination site (10). A power level of transmission at the site transceiver (12, 15) is adjusted to an optimum level if an acknowledgement is not received from a network gateway (30) in response to data transmissions from the site transceiver (12, 15). Also, for each unsuccessful transmission period, the amount of metering data is increased in the next transmission period to make up for the failed communication tries. Upon establishing communication with the gateway (30), the site transceiver (12, 15) can receive commands from the gateway (30) that further adjust its power level of transmission to optimize reception at the gateway from a large plurality of utility meter data origination sites (10) within a geographical area served by the gateway (30). The gateway (30) communicates utility metering data through a wireless network (40), such as WIFI, GPRS, POE or CDMA to a data collection center (50) for data processing and billing operations.

6 Claims, 4 Drawing Sheets

APPARATUS AND METHOD FOR ESTABLISHING COMMUNICATION FROM REMOTE SITES IN A FIXED METER READING NETWORK

CROSS-REFERENCE TO RELATED APPLICATION

This is a continuation-in-part of U.S. patent application Ser. No. 12/635,079, filed Dec. 10, 2009 now abandoned, and the benefit of its earlier filing date is claimed herein for commonly disclosed subject matter.

TECHNICAL FIELD

This invention relates to automatic meter reading systems, and in particular to utility meters using methods and apparatus for transmitting metering data signals to a fixed radio receiver in a radio frequency wireless network for collecting utility metering data.

DESCRIPTION OF THE BACKGROUND ART

A typical fixed network automatic meter reading system comprises some utility meter data origination sites, repeaters, gateways, and a backhaul network. The utility meter data origination points include radio frequency transmitters or transceivers located at a utility meter, which is contemplated as a water meter or a gas meter. Typically, these utility meters are not connected to a source of AC power and they are operated on battery power, which distinguishes them from electric meters which have a ready source of electrical power. The transmitters or transceivers communicate with receivers via a wireless radio frequency communication link. If these receivers communicate with a large number of utility meter data origination sites (hereafter sometimes referred to simply as "sites") either directly or through relay devices known as repeaters, and also interface to a backhaul network, they are known as gateways. Gateways collect the data from a plurality of utility meter data origination sites and pass the information through a wired or wireless network (local or wide area network), sometimes called a "backhaul network," to a central data collection system, where the data is processed for billing purposes. This backhaul network may include various public or private systems such as the WIFI (a wireless LAN), GPRS (a second generation cellular network), POE (Power over Internet), or CDMA (code division multiple access) or others known in the art.

These systems. both mobile and fixed, were known in the art as AMR systems or "Automatic Meter Reading Systems." More recently, the term "AMI" or "Advanced Metering Infrastructure" has been used to describe fixed network systems with some two-way communication abilities.

Cerny et al., U.S. Pat. No. 5,298,894, discloses an early example of a mobile automatic meter reading (AMR) system in which a utility meter transmitter transmits radio frequency (RF) metering data from subsurface utility meter enclosures to an RF collection unit.

Gastouniotis et al., U.S. Pat. No. 4,940,976, discloses an early example of a fixed network for transmitting data from a plurality of remote metering sites to a data center through a plurality of fixed receiving stations. In fixed receiver network systems today, the receiver units can be mounted on utility poles, or on water storage tank towers, or inside of electric meters or in utility pedestals. As opposed to mobile systems, it is not necessary to provide people and equipment to travel through the areas where readings are to be collected.

There is a problem in installing and operating fixed network systems in that various features of the topography, such as trees, buildings, uneven terrain, and structures, particularly metal structures, may attenuate or block signals from different sites where meters and transmitters are located.

AMR and AMI systems must communicate over a limited number of radio frequency channels. Integrated circuits supporting these communications are designed to operate over this limited number of radio frequency channels. Relatively lower frequencies are preferred for transmitting through obstructions. The number of channels licensed by the Federal Communications Commission is a limitation, and the bandwidth of operation on these channels is another limitation.

There is also the problem that remote site transmitters operate on battery power, and therefore, simply increasing power levels for transmitter operation is not an overall system solution if it shortens battery life. The system must be adaptable to allow a large number of remote sites to communicate through gateways to a network data reader at a data collection center.

SUMMARY OF THE INVENTION

The invention provides a method and apparatus for optimizing and adjusting power levels at the utility meter data origination sites in an automatic meter reading network.

In a method of communications between a gateway fixed transceiver and a plurality of transceivers located at respective utility meter data origination sites, radio frequency signals are transmitted from a site transmitter at one of the utility meter data origination sites in a first message to be received by the gateway fixed transceiver. The site transmitter, which also has some reception ability, listens for an acknowledgement signal from the gateway fixed transceiver. Upon not detecting the acknowledgement signal within a defined time period, the site transmitter transmits the first message from the site transmitter in one or more retries in a condition for reception by the gateway fixed transceiver; and listens again for an acknowledgement signal from the gateway fixed transceiver. Upon not detecting the acknowledgement signal within a second defined time period or within a number of retries at the site transmitter, a power level of transmission of the site transmitter is changed to an optimum level and radio frequency signals are transmitted on a last retry of the first message in a condition for reception by the gateway fixed transceiver. Upon receiving the radio frequency signals from the site transmitter, the gateway fixed transceiver sends an acknowledgement signal; and the gateway fixed transceiver can also transmit a command to adjust the power level of transmission of the site transmitter for further communications.

The invention is also embodied in a utility meter interface circuit for use in an automatic meter reading network, the utility meter interface circuit comprising a site transmitter that transmits radio frequency signals from one of a plurality of utility meter data origination sites in a condition to be received by a gateway fixed transceiver and within a defined time slot associated with the one of the respective utility meter data origination sites. The interface circuit also has a receiver that listens for an acknowledgement signal from the gateway fixed transceiver; and whereupon the site receiver not detecting the acknowledgement signal within a defined time period, the utility meter interface circuit provides control circuitry for executing one or more retries in which site transmitter transmits the first message in a condition for reception by the gateway fixed transceiver. The site receiver again listens for an acknowledgement signal from the gateway fixed transceiver; and upon the site receiver not detecting the acknowledgement signal within a defined time interval or a number of retries, the control circuitry adjusts the transmission power level for the site transmitter to an optimum level on a last retry and the site transmitter again transmits radio frequency signals in a condition for reception by the gateway fixed transceiver. The control circuitry is responsive to an acknowledgement signal received from the gateway fixed transceiver to skip further retries, and is also responsive to a command that received from the gateway fixed transceiver to further adjust the transmission power level of the site transmitter.

As a further feature, the current meter reading is transmitted in all meter data transmissions originating from the sites, but where a site transmission has been made and an acknowledgement signal has not been received, the next site transmission will include additional meter reading data in subsequent messages to make up for the non-acknowledged transmission cycle.

The adjustment of power level is first controlled by the site transmitters and not the gateway fixed receiver or the data collection center. Only after communications are established for some time does the data collection center transmit data for adjusting power levels of transmission at the site transmitters.

The invention is particularly applicable to circuitry associated with water meters and gas meters including transmitters that operate on battery power.

This invention allows for extension of battery life, for optimal use of radio frequency channels and for an increase in volume of utility metering data collection for a defined geographical area.

Other features of the invention, besides those discussed above, will be apparent to those of ordinary skill in the art from the description of the preferred embodiments which follows. In the description, reference is made to the accompanying drawings, which form a part hereof, and which illustrate examples of the invention. Such examples are illustrative, and for the scope of the invention, reference is made to the claims which follow the description.

DETAILED DESCRIPTION

Figure 1:
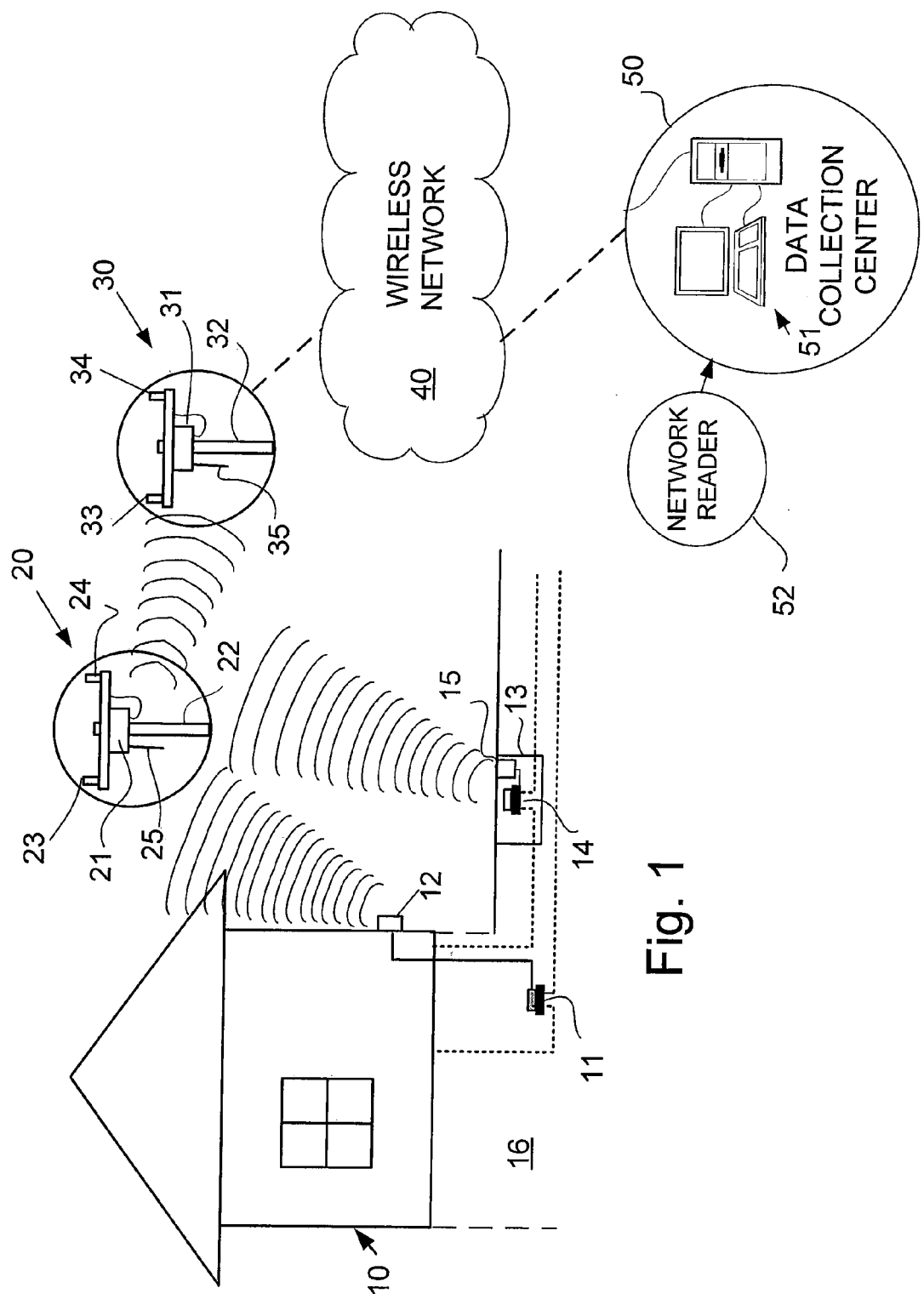
FIG. 1 is a schematic view of a system for transmitting meter data from utility meter data origination points to a data collection center via a gateway.

Referring to FIG. 1, a fixed automatic meter reading system includes a meter and meter register assembly 11 connected in a water line (shown schematically as a dashed line in FIG. 1) serving a residential building 10 through a basement. 16 or a foundation crawl space. For buildings built on a concrete slab foundation, entry can be made through the slab or through a side wall. The assembly 11 includes a meter register for transmitting pulses to a transceiver assembly 12 mounted somewhere within or on the building 10. Alternatively, a meter and meter register assembly 14 can be connected in a water line (shown schematically as a dashed line in FIG. 1) and disposed in a subsurface pit enclosure 13 adjacent the building 10. The meter assemblies 11, 14 each include a register for transmitting pulses to a transceiver assembly 15 mounted to a pit lid, for example as further disclosed in Cerny et al., U.S. Pat. No 5,298,894 and Bloss Jr. et al, U.S. Pat. No. 5,825,303 and other known well known prior art.

The meter register in the assembly 11, 14 can be a unit that is commercially distributed by Badger Meter, Inc., the assignee of the present invention, under the trade designation "Recordall" Transmitter Register (RTR). Besides displaying units of consumption, this device uses a pulse transmitter that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art, such as the absolute digital encoder (ADE) circuit offered by the assignee of the present invention can also be used as the meter register.

Typically, the site transceiver assemblies 12, 15 are not connected to a source of AC or DC power and are operated on battery power. The site transceiver assemblies 12, 15 communicate with network transceiver assemblies 20, 30 via a wireless radio frequency communication link. The network is a fixed network, which is characterized by fixed network transceiver assemblies 30, as opposed to mobile transceivers carried in a vehicle or carried by a human employed to collect meter data. The transceiver assemblies 20, 30 can communicate with the site transceiver assemblies 12, 15, either directly, or through intermediate fixed transceiver assemblies 20 known as repeaters. The repeaters 20 receive messages from the site transceiver assemblies 12, 15 and relay the data in further radio frequency messages to the gateway transceiver assemblies 30. Or, the repeaters 20 can communicate in an opposite direction by receiving radio frequency messages from the gateway transceiver assemblies 30 and relaying the data content in further radio frequency messages to the site transceiver assemblies, 12, 15.

If these transceiver assemblies 30 communicate with a backhaul network, such as network 40, they are known as gateways (to the network). These transceiver units or gateways 30 can be mounted on utility poles, streetlight poles, or on other high structures such as buildings or water storage tank towers, or can be placed inside of electric meters or in utility pedestals. Gateways typically have a source of AC power, which can be converted to DC power for operating circuitry in the gateway. Gateways collect the data that is received from a plurality of transceivers 12, 15 at the utility meter data origination sites and pass the data via a second network, sometimes called a backhaul network to a central data collection system shown as a control center 50 in FIG. 1. In this example, the backhaul network is a wireless network 40. This wireless network 40 can include various public or private wireless systems operating according to at least one of the following protocols; WIFI (a wireless local area network connected to the Internet), GPRS (a second generation cellular network), POE (Power over Ethernet to the Internet) or CDMA (code division multiple access) and others known in the art.

The network transceiver assemblies 20, 30, each have a mast support 22, 32, for installation on a supporting structure, such as a utility pole, a streetlight pole, a building or a tower. Two antennas 23, 24 and 33, 34 are provided on cross members on the mast supports 22, 32 for receiving signals from the site transceivers 12, or in the case of the gateway transceiver unit 30, receiving signals from the repeaters 20. Signals can also be transmitted through the antennas 23, 24 to the gateway transceiver 30. A third antenna 25, 35 is provided in the fixed transceiver assemblies 20, 30 for transmitting signals to the wireless network 40. The transceiver electronics are housed in a housing 21, 31 situated on the masts 22, 32, just under a cross bar supporting the antennas, 23, 24 and 33, 34.

The site transceiver assemblies 12, 15 transmit an electronic message that generally includes an identification code, current meter reading data, historical consumption data, status information, and an error code for checking the data at the receiving end. The meter data is eventually collected at the data collection center 50 for billing purposes. This data collection center 50 includes one or more computers 51 for communicating with the backhaul network 40 and processing the utility metering data into customer billing statements. The data collection center 50 also includes a network reader computer program 52, running on a computer 51 for managing communications with the meter data collection network. This computer program is further described in U.S. Pat. Pub. No US2009/0216878, published Aug. 27, 2009.

Figure 2:
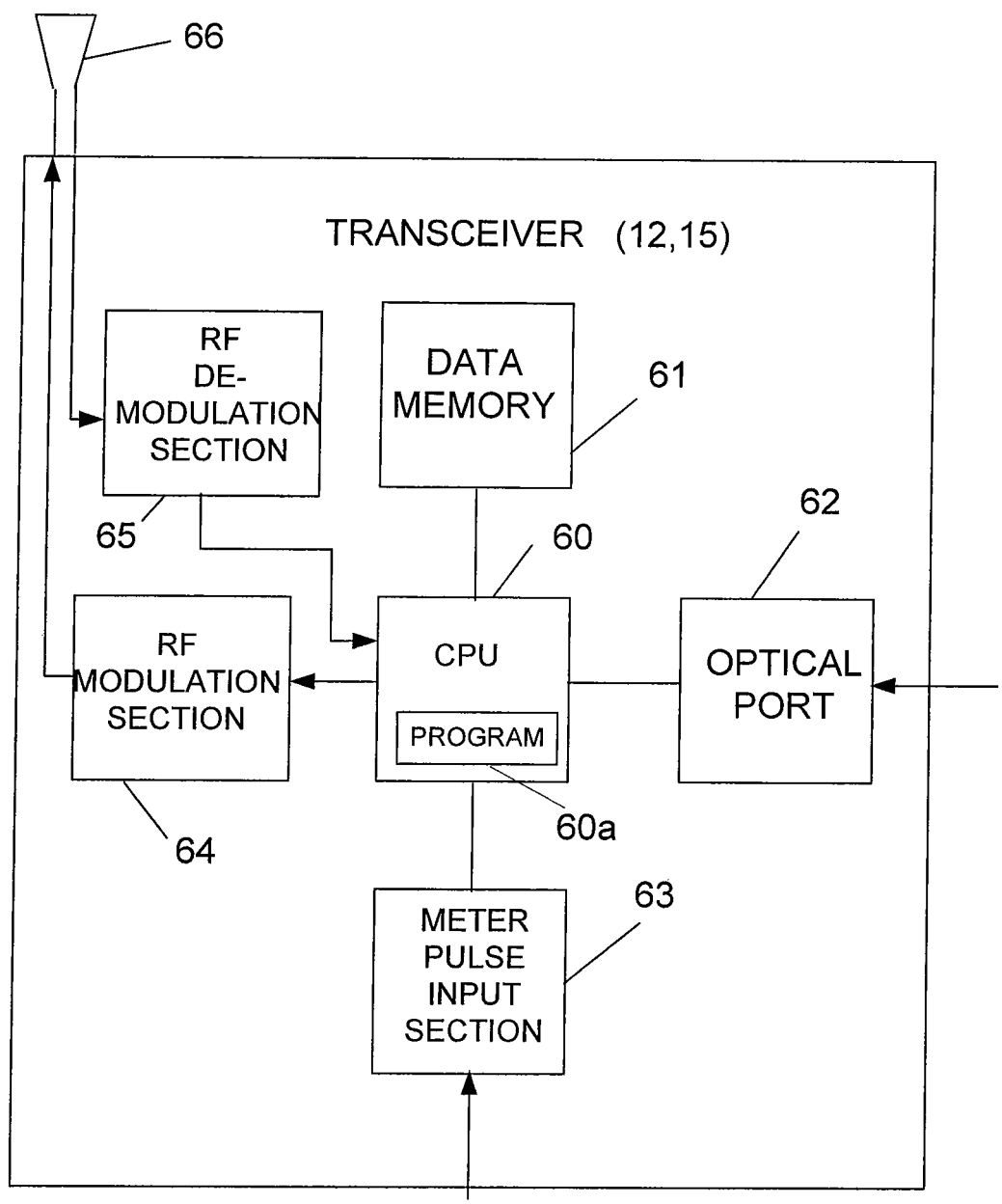
FIG. 2 is a block diagram of a metering data transceiver associated with a utility meter.

Referring to FIG. 2, the transceiver assembly 12, 15 more particularly includes an electrical circuit typically formed on a circuit board and including a microelectronic CPU 60 operating according to a control program stored in an on-board program memory 60a. The program memory 60a is preferably nonvolatile, but it can be written to with a special programming unit, which communicates with the transceiver through an optical I/O port 62. The CPU 60 typically also utilizes an external RAM memory 61 for temporary storage of historical consumption data.

As further seen in FIG. 2, the CPU 60 receives pulses through a meter pulse input section 63 from a pulse encoder (not shown) in a meter register. This input section can receive a pulse input or an input from an absolute digital encoder (ADE) circuit of a type known in the art. The CPU 60 then transmits metering data in a message protocol, which is modulated onto radio frequency (RF) carrier signals by an RF modulation section 64. The RF signals are transmitted through an antenna 66 to one of the network transceiver assemblies 20, 30 in the fixed network (FIG. 1). Radio signals can also be received through the antenna 66 from the receivers or gateways 20, 30 and these signals are demodulated by a demodulation section 65 to extract data from the RF carrier signals for processing by the CPU 60. This data can include commands and configuration data for operation of the site transceiver assembly 12, 15.

A transceiver 12, 15 at the utility meter data origination site will typically transmit data to a network receiver 20, 30 in the fixed network three times per day. The transmission will be made through frequency hopping within a frequency range of from 902 MHz to 928 MHz. A frequency shift keying (FSK) type of modulation is utilized for these transmissions. The network receiver 20, 30 can respond with radio frequency signals carrying command information for adjusting the real time clock on the site transceiver 12, 15, adjusting the power level of transmissions from the site transceiver, adjusting the frequency of transmissions and requesting historical consumption data from the site transceiver 12, 15. The power level of transmission from the site transceiver 12, 15 is programmable in a range of from 1-30 dBm, which is applied to the antenna gain for the antenna 66 to determine the transmission power level.

Each site transceiver assembly 12, 15 is powered by one or more on-board batteries as is well known in the art. In order to provide a longer battery life, communication between a site transceiver 12, 15 and the fixed network transceivers 20, 30 is preferably initiated from the site transceiver 12, 15. The site transceivers 12, 15 are battery-powered while the network transceivers 20, 30 are typically powered from an available AC source. As part of the network operation, site transceivers 12, 15 have individual serial numbers which are part of any communication to and from an assigned gateway 30. To conserve battery resources, the site transceivers 12, 15 attempt to communicate with their assigned gateway 30 at scheduled times only a few times per day and at least once per day. When communication is initiated by the site transceivers 12, 15 to send utility consumption data, the gateway 30 can then respond (through a repeater 20, if necessary) with requests for additional data or the gateway 30 can send command and configuration data to the site transceivers 12, 15.

Figure 3:
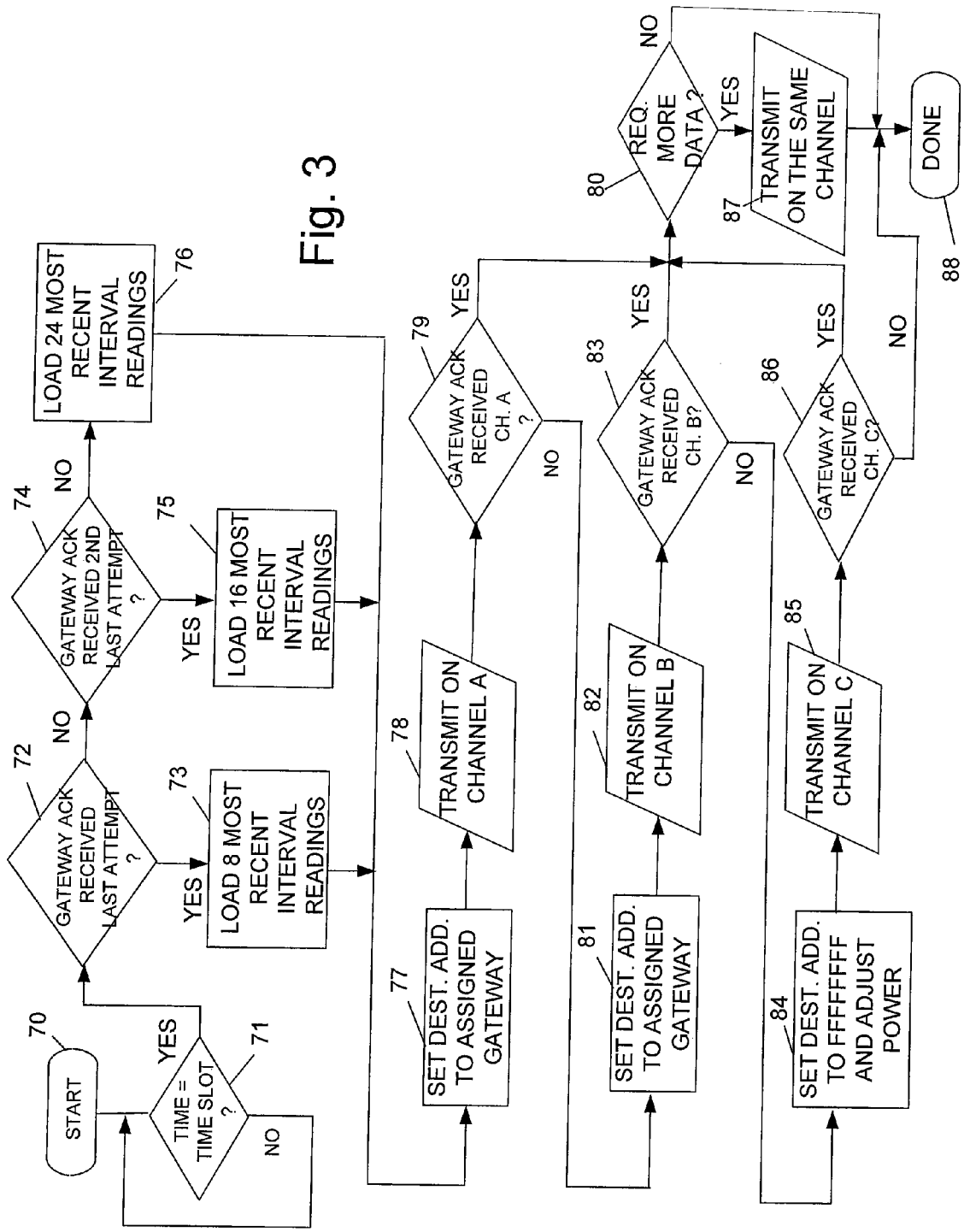
FIG. 3 is a flow chart of the programmed operation of the transceiver of FIG. 2 in the network of FIG. 1.

Referring to FIG. 3, a program routine executed in the site transceivers 12, 15 at the utility meter data origination sites is diagrammed. In this routine, the blocks represent groups of instructions in a control program stored in the program memory 60a and executed by the CPU 60. As represented by start block 70, this represents a start of the routine. As represented by decision block 71, a check is made the CPU 60 to determine whether this is the time slot for communication by the site transceivers to the gateway 30. Site transceiver assemblies 12, 15 are assigned to communicate with specific gateways in specific programmed time slots. All RF communication sequences between the site transceiver assemblies 12, 15 and gateway 30 are initiated by the site transceiver assemblies 12, 15. At the scheduled time, the site transceiver assemblies 12, 15 will transmit one of three messages containing varying amounts of meter data on a first channel frequency (A). The site transceiver 12, 15 will try to complete a transmit-and-acknowledgement cycle three times for each message on three channels (A, B and C). The site transceiver assemblies 12, 15 will then listen for a response on the same frequency channel that it sent the information. At a minimum, this response from the gateway 30 comprises an updated system time that acts as an acknowledge signal that the message was received. The gateway 30 can request additional information in the message containing the acknowledgement. If there is additional information requested, the site transceiver will transmit the data on the same frequency channel.

If a site transceiver assembly 12, 15 receives the acknowledgement and transmits the requested information, when requested, then the sequence is completed. If the site transceiver assembly 12, 15 does not receive an acknowledgement it will attempt a transmission two additional times. These two additional retries will be made on different channel frequencies (B and C). The only difference in the message content is the destination address which is the address of the assigned gateway. The first two attempts will have the destination address that is the specific assigned gateway. The third attempt will include a global receiver address, such as FFFFFFFF. The third attempt will also be made at an adjusted power level to promote a successful communication.

As represented by decision block 72, the CPU 60 checks to determine whether the last scheduled transmission was successful as determined by receipt of an acknowledgement signal from the gateway. If the answer is "Yes," as represented by the "Yes" result, the routine branches and the CPU 60 executes instructions represented by process block 73 to load the eight most recent meter readings into a first message for transmission. If the answer is "No," as represented by the "No" result branch from block 72, the routine proceeds to execute further instructions as represented by decision block 74 to determine whether the second last transmission was successful, in which case, the routine branches, as represented by the "Yes" result to process block 75, where the CPU 60 executes further instructions to form the sixteen most recent meter readings into a second message for transmission. If the answer is "No," as a result of executing block 74, the CPU 60 proceeds to execute instructions represented by process block 76 to form the twenty-four most recent meter readings into a third message for transmission.

After determining which of three messages this is, the CPU 60 then tries to send the message on one of three frequency hopping frequencies A, B or C, from among fifty such frequencies in the transmission frequency band. The first attempt is represented by the block labeled "set destination address to assigned gateway," (process block 77), "transmit on channel A" (I/O block 78) and checking for receipt of an acknowledge signal (decision block 79). The second attempt is represented by the block labeled "set destination address to assigned gateway," (process block 81), "transmit on channel B" (I/O block 82) and checking for receipt of an acknowledge signal (decision block 83). For the third transmission, on Channel C, the CPU 60 also executes instructions to "set destination address to FFFFFFFF, a global address, and adjust the power of transmission (process block 84), "transmit on channel C" (I/O block 85) and checking for receipt of an acknowledge signal (decision block 86). If the first attempt is unsuccessful, as represented by the "No" result from decision block 79, then the routine proceeds to try to transmit and receive an acknowledgement on the second channel. If the second attempt is unsuccessful, as represented by the "No" result from decision block 83, then the routine proceeds to try to transmit and receive an acknowledgement on the third channel. If the third attempt is unsuccessful, as represented by the "No" result from decision block 86, then the routine proceeds to the "Done" block 88.

In any of the three attempts, if an acknowledge signal is received from a gateway, then a check is made to see if more data is requested by the gateway as represented by decision block 80. If the result is "Yes," the site transceiver assemblies 12, 15 will make another transmission on the same channel with the successful transmission. The routine then proceeds to the "Done" block 88.

As shown in I/O block 87, the reply from the receivers 20, 30 and the response from the site transceiver assembly 12, 15 with additional information, is always communicated on the same channel as the initial broadcast. This simplifies the circuitry in the site transceiver assembly 12, 15. When the site transceiver assembly 12, 15, can listen on the same channel that the information was sent, scanning circuitry becomes unnecessary. Because scanning is not required at the meter data origination sites, the gateway messages can be received faster by limiting the reception time at the site transceiver 12, 15 to conserve battery life.

At the end of three tries to transmit each of three messages, the routine is completed as represented by the "No" result branch from decision block 86, and the routine is exited back to the main task, as represented by "Done" block 88. Although in this example, there are three tries with three messages, the invention can also be practiced in a system using a greater number of tries and a greater number of messages.

Figure 4:
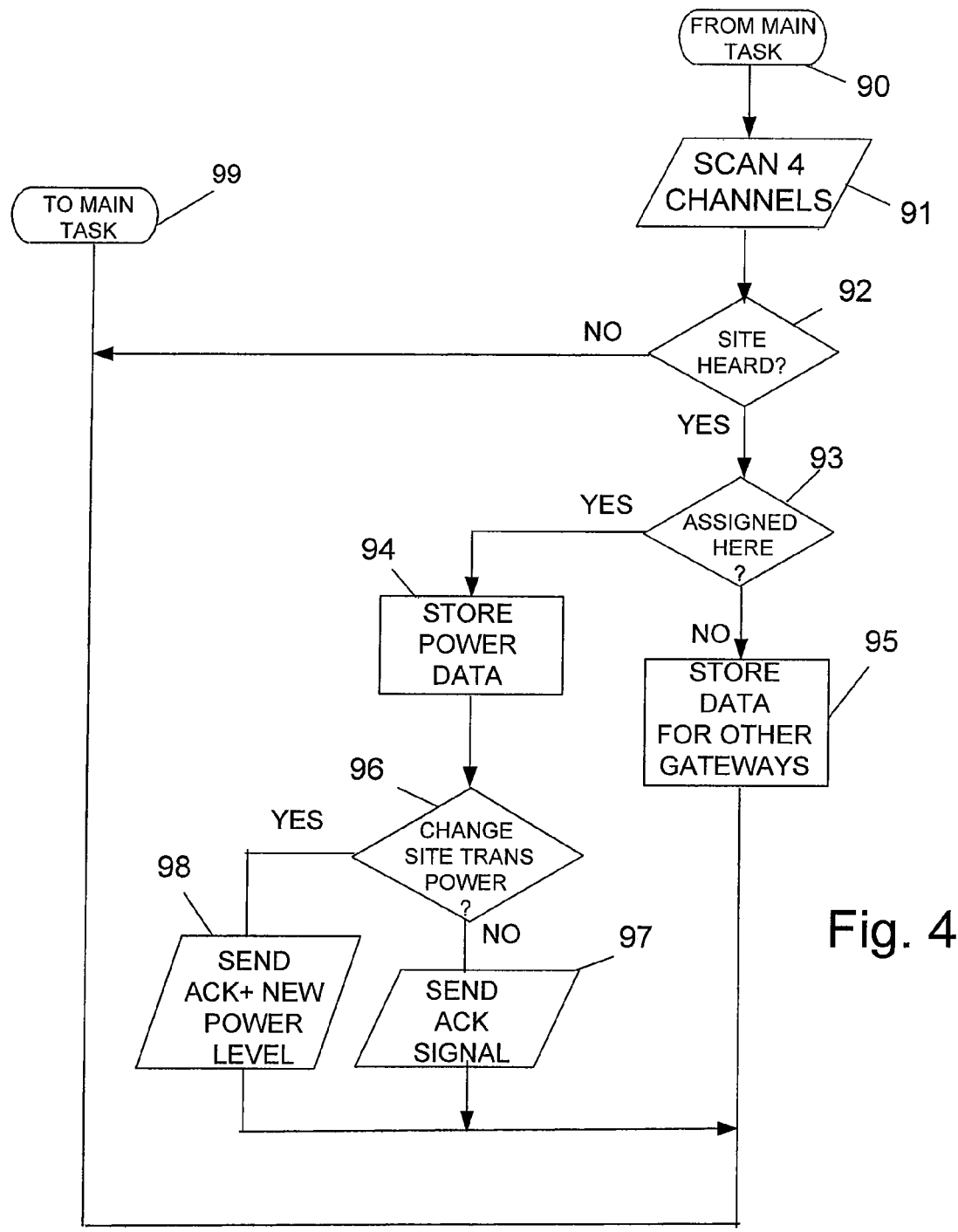
FIG. 4 is a flow chart of the programmed operation of the gateway transceiver in the network of FIG. 1.

Referring to FIG. 4, a program routine executed in the transceivers at the gateway 30 is diagrammed. In this routine, the blocks represent groups of instructions in a control program stored in the program memory 60a and executed by a CPU 60 similar to those shown in FIG. 2, but located in the gateway 30. As represented by start block 90, this represents a start of the routine after a branching from a main task or thread of the control program. The CPU 60 executes one or more program instructions to simultaneously scan four of the fifty possible frequency channels to detect a transmission from a site transceiver. A system of prioritization is used to process communications being received. The first priority is to process a message with the current gateway address. The second priority is to process a message with global address. Lastly, the gateway will detect and store messages addressed to other gateways.

As represented by decision block 92, the gateway processor executes instructions to determine whether any message is received. If the answer is "Yes," as represented by the "Yes" result" branch from block 92, the program executes instructions represented by decision block 93 to determine whether the message includes the address for this gateway. If the answer is "Yes," as represented by the "Yes" result" branch from block 93, the program executes an instruction to store data which is used to evaluate power level of the signals from the site as represented by process block 94. If the answer is "No," as represented by the "No result" branch from block 93, the CPU executes instructions to store data which is used to evaluate power level of the signals from other sites that are not assigned to this gateway, as represented by process block 94.

After executing instructions to perform the acts of process block 94, the CPU 60 executes further instructions represented by decision block 96, to determine if the power level should be changed at the site by transmitting a command in a message to the site. If the result of this decision is "Yes," as represented by the "Yes" result branch from decision block 96, the CPU 60 next executes instructions to transmit an acknowledgement signal and to change the power level command signal to the site, as represented by I/O block 98. If the result of this decision is "No," as represented by the "No" result branch from decision block 96, the CPU 60 next executes instructions to transmit an acknowledgement signal but not a change to the power level command signal to the site, as represented by I/O block 97. After one of these two actions, the routine will be exited back to the main task through end block 99.

The gateway 30 can transmit operational data parameters received from the site transceiver 12, 15 to the control center 50 for calculation of an optimum transmission power level for the site transceiver based on network conditions, including the number and distribution of sites and success of transmissions and the relative power of transmission from sites in a common geographical area. A site transmission power level parameter is sent from the control center 50 to the gateway 30, which can then send a message with a command to the site transceiver 12, 15 (through a repeater 20, if necessary) to adjust the site transmission power level to the calculated, optimum power level based on network conditions.

One advantage of the invention is that it requires only a single transceiver per utility meter data origination site and provides both transmission and reception modes of operation with common circuitry.

Another advantage of the invention is that it conserves battery life.

Another advantage of the invention is that by selecting certain time periods, it maximizes communication and minimizes interference between communications.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A utility meter interface circuit for use in a fixed automatic meter reading network, the utility meter interface circuit comprising: a site transmitter that transmits a first message, as a first transmission of radio frequency signals from one of a plurality of utility meter data origination sites in a frequency channel to be received by a gate way fixed transceiver; a site receiver at the one of the utility meter data origination sites that listens for an acknowledgement signal from the gateway fixed transceiver; and whereupon the site receiver not detecting the acknowledgement signal within a defined time period; control circuitry for executing one or more retries of transmitting the first message for reception by the gateway fixed transceiver; and the site receiver again listening for the acknowledgement signal from the gateway fixed transceiver; and upon the site receiver not detecting the acknowledgement signal within a second defined time, the site transmitter transmitting radio frequency signals on a last retry for reception by the gateway fixed transceiver; and wherein after three tries to transmit the first message, and upon not receiving the acknowledgement signal, a second message is transmitted from the site transmitter and includes meter reading data for the last sixteen meter reading intervals to make up for non-acknowledged transmissions of the first message.

2. The utility meter interface circuit as recited in claim 1, wherein after three tries to transmit the first message and three tries to transmit the second message, and upon not receiving the acknowledgement signal, a third message is transmitted from the site transmitter and includes meter reading data for the last twenty-four meter reading intervals.

3. The utility meter interface circuit as recited in claim 1, wherein:
   the control circuitry is incorporated in a CPU operating according a stored control program; and
   wherein the site transmitter includes a radio frequency modulation section for modulating meter data signals onto RF signals for transmission; and
   wherein the site receiver includes a radio frequency demodulation section for demodulating data from RF signals received from another device within a network.

4. The utility meter interface circuit as recited in claim 3, wherein the site transmitter and the site receiver at the utility meter data origination site are formed by common circuitry.

5. A method of communications between a gateway fixed transceiver and a plurality of transceivers located at respective utility meter data origination sites, the method comprising: transmitting radio frequency signals from a site transmitter at one of the utility meter origination sites in a first message to be received by the gateway fixed transceiver; listening at the site transmitter for an acknowledgement signal from the gateway fixed transceiver; and upon not detecting the acknowledgement signal within a defined time period, transmitting radio frequency signals from the site transmitter in one or more retries of the first message for reception by the gateway fixed transceiver; and listening at the site transmitter for the acknowledgement signal from the gateway fixed transceiver; and wherein after three tries to transmit the first message, and upon not receiving the acknowledgement signal, a second message is transmitted from the site transmitter and includes meter reading data for a last sixteen meter reading intervals to make up for non-acknowledged transmissions of the first message.

6. The method as recited in claim 5, wherein after three tries to transmit the first message and three tries to transmit the second message, and upon not receiving the acknowledgement signal, a third message is transmitted from the site transmitter and includes meter reading data for a last twenty-four meter reading intervals.

* * * * *